(12) United States Patent
Wu et al.

(10) Patent No.: US 7,884,576 B2
(45) Date of Patent: Feb. 8, 2011

(54) CHARGER PROTECTION DEVICE

(75) Inventors: Ching-Yuan Wu, Tu-Cheng (TW);
Wei-Peng Kao, Tu-Cheng (TW);
Yu-Chieh Lin, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 290 days.

(21) Appl. No.: 12/133,503

(22) Filed: Jun. 5, 2008

(65) Prior Publication Data

US 2009/0167251 A1 Jul. 2, 2009

(30) Foreign Application Priority Data

Dec. 27, 2007 (CN) .................. 2007 1 0203494

(51) Int. Cl.
*H02J 7/00* (2006.01)
*H02J 7/04* (2006.01)
*H02J 7/16* (2006.01)

(52) U.S. Cl. .............. 320/134; 320/136; 320/144; 320/150; 320/153; 320/154

(58) Field of Classification Search .............. 320/134
See application file for complete search history.

(56) References Cited

U.S. PATENT DOCUMENTS

| | | | | |
|---|---|---|---|---|
| 5,703,470 | A | * | 12/1997 | Baranowski et al. ......... 320/152 |
| 2003/0112080 | A1 | * | 6/2003 | Amiot et al. ............... 331/36 C |
| 2007/0273328 | A1 | * | 11/2007 | Nam et al. .................. 320/112 |
| 2008/0024090 | A1 | * | 1/2008 | Guang et al. ................ 320/148 |

* cited by examiner

*Primary Examiner*—Edward Tso
*Assistant Examiner*—Ahmed Omar
(74) *Attorney, Agent, or Firm*—Steven M. Reiss

(57) ABSTRACT

A charger protection device (20) includes an oscillator (201), a resistor (204) electronically connected to the oscillator, a capacitor (203) electronically connected to the resistor and a switch (202). The oscillator (201), the resistor (204) and the capacitor (203) form an oscillating circuit. The switch is electronically connected to the capacitor, and a voltage across the capacitor is input to the switch.

15 Claims, 2 Drawing Sheets

CHARGER PROTECTION DEVICE

BACKGROUND OF THE INVENTION

1. Field of the Invention

The present invention relates to charger protection devices, particularly to a charger protection device used to protect batteries and chargers when at extreme temperatures.

2. Description of Related Art

Charging a battery should only be done when the battery is in an appropriate temperature range. Too high or too low of temperature can damage the battery and the charger. Thus, a protecting device is often used in a charging circuit to automatically stop charging the battery when the battery becomes too hot or too cold.

Referring to FIG. 2, a typical charger protection device 10 includes a controlling IC (integrate circuit) 101, a switch 102 and a thermistor 103. The controlling IC 101 and the switch 102 are installed in a charger 11. The controlling IC 101 is electronically connected to the switch 102 to control the switch 102. The thermistor 103 is incorporated in a battery 12.

In use, the charger 11 is electronically connected to a power supply (not shown). The battery 12 is electronically connected to the charger 11, and the controlling IC 101 is electronically connected to the thermistor 103. When the switch 102 is turned on, the power supply charges the battery 12 via the charger 11. Since the resistance of the thermistor 103 changes in accordance with the temperature thereof, the controlling IC 101 can detect the temperature of the battery 12 via measuring the resistance of the thermistor 103. In the charging process, when the temperature of battery 12 changes, the resistance of the thermistor 103 also changes. The controlling IC 101 detects the temperature of the battery 12 according to the resistance of the thermistor 103. If the temperature of the battery 12 is too high or too low, the controlling IC 101 automatically turns off the switch 102 to stop the charging process, thus protects the charger 11 and the battery 12.

However, in use of the typical charger protection device 10, if the resistance of the thermistor 103 changes too frequently according to the temperature, the controlling IC 101 may crash because of being overloaded with calculations. When the controlling IC 101 crashes, it cannot detect the temperature of the battery 12 and control the switch 102. Thus, the charger 11 and the battery 12 may be damaged by high or low temperatures during charging.

Therefore, a new charger protection device is desired in order to overcome the above-described shortcomings.

BRIEF DESCRIPTION OF THE DRAWINGS

Many aspects of the present charger protection device can be better understood with reference to the following drawings. The components in the various drawings are not necessarily drawn to scale, the emphasis instead being placed upon clearly illustrating the principles of the present charger protection device. Moreover, in the drawings, like reference numerals designate corresponding parts throughout the diagrams, in which.

DETAILED DESCRIPTION OF THE INVENTION

Figure 1:
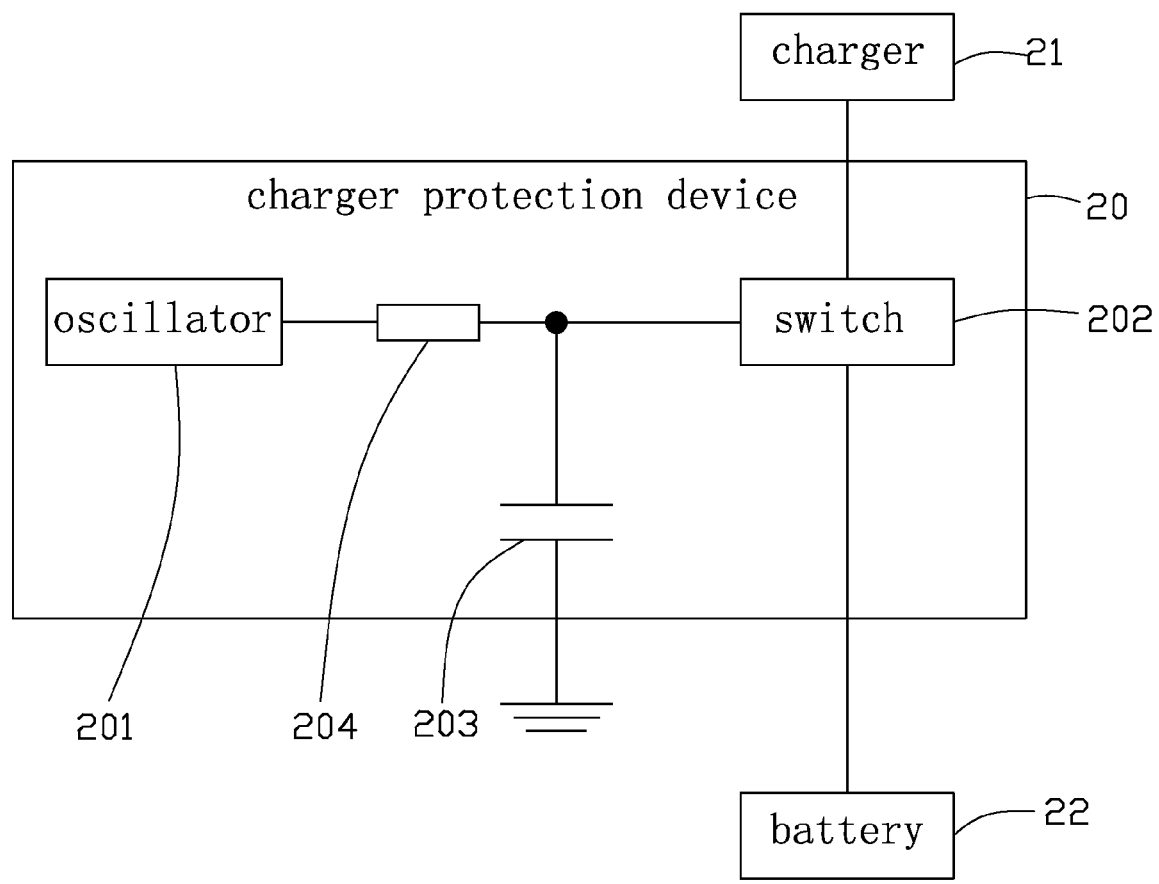
FIG. 1 is a diagram of a charger protection device, in accordance with an exemplary embodiment.
Figure 2:
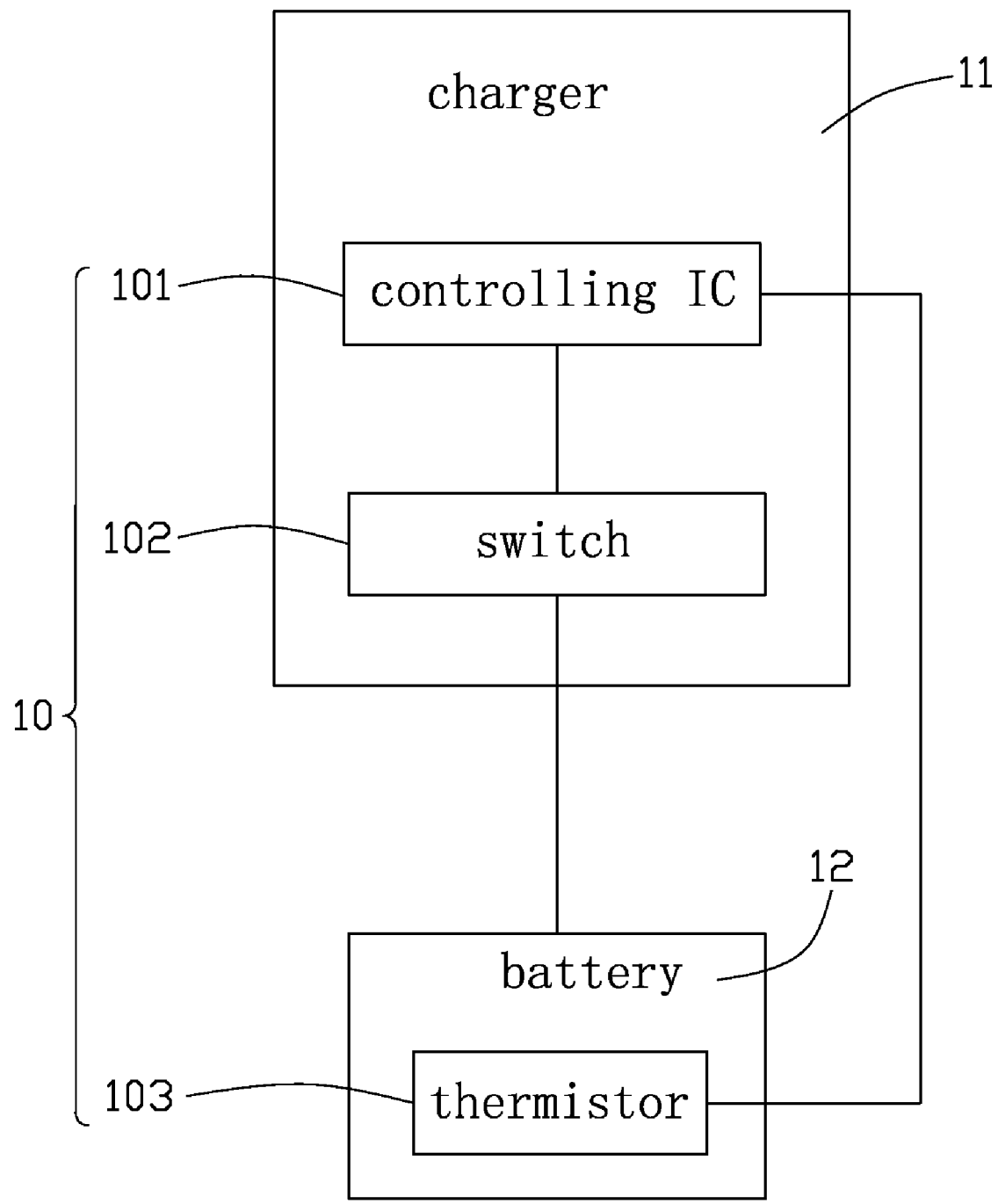
FIG. 2 is a diagram of a typical charger protection device.

Referring to FIG. 1, a charger protection device 20 in accordance with an exemplary embodiment is shown. The charger protection device 20 is used to prevent batteries and chargers from being damaged should the battery become too hot or too cold. Understandably, the charger protection device 20 can be installed in a charger and/or a battery, and can also be independently fabricated.

The charger protection device 20 includes an oscillator 201, a switch 202, a capacitor 203, and a resistor 204. The oscillator 201 is used to generate oscillating signals in a predetermined frequency. The switch 202 is configured to automatically turn on when receiving a predetermined low input voltage and turn off when receiving a predetermined high input voltage.

The capacitor 203 is a Z5U capacitor. A capacitance of the capacitor 203 changes according to its temperature. Generally, the capacitance C of the capacitor 203 is at a maximum at a temperature of about 25° C., and decreases at higher or lower temperatures. Particularly, a capacitance of the capacitor 203 decreases markedly at a temperature higher than 60° C. or lower than −10° C. The capacitor 203 has one lead electronically connected to the resistor 204 and another lead grounded. The resistor 204 is electronically connected to the oscillator 201, then the oscillator 201, the resistor 204 and the capacitor 203 form an oscillating circuit (not labeled). The switch 202 is electronically connected to the node between the resistor 204 and the capacitor 203, thus the voltage $V_C$ across the capacitor 203 is input to the switch 202 to control the switch 202.

In use, a typical charger 21 is electronically connected to a typical battery 22 via the switch 202, and a power supply (not shown) is electronically connected to the charger 21. The charger protection device 20 is positioned in a place where is convenient for detecting temperatures of the charger 21 and the battery 22. In this way, the charger 21 can be used to charge the battery 22 via the charger protection device 20, and the charger protection device 20 can control the charging process via the switch 202. Understandably, anyone of the oscillator 201, the switch 202, the capacitor 203, and the resistor 204 can be installed in the charger 21 or the battery 22.

In a charging process, the oscillator 201 continuously generates oscillating signals. A power supply for generating the oscillating signals can be the power supply charging the battery 21 or another independent power supply. A frequency of the oscillator signals is $\omega$, a capacitance of the capacitor 203 is C, a resistance of the resistor 204 is R, the following equation can be used to calculate the voltage $V_C$ across the capacitor 203:

$$V_C = (1/j\omega C)/[R+(1/j\omega C)] = 1/(1+j\omega CR)$$

As can be determined by this equation, the voltage $V_C$ decreases when the capacitance C increases, and increases when the capacitance C decreases.

As detailed above, the capacitance C of the capacitor 203 has a maximum at a temperature of about 25° C., and decreases above or below that temperature. Therefore, the voltage $V_C$ is at a minimum at about 25° C. Thus, a voltage $V_C$ that exceeds a predetermined value can be set as a high potential, and a voltage $V_C$ within a safe range can be set as a low potential. In this way, when the voltage $V_C$ is used to control the switch 202, the switch 202 can automatically turn on when the voltage $V_C$ is low and turn off when the voltage $V_C$ is high. Thus, the charger protection device 20 can automatically stop a charging process when either or both of the charger 21 and the battery 22 are too hot or too cold.

Understandably, the safe range of the temperature resulting in a low potential $V_C$ used to turn on the switch 202 can be changed according to different demands. Generally, the safe range of the temperature resulting in a low potential is predetermined to be about 0° C.-60° C., and a temperature that is higher than 60° C. or lower than 0° C. is predetermined to result in a high potential. In this way, the charger protection device 20 can be used in most common conditions.

Furthermore, the capacitor 203 can be types other than Z5U, provided capacitance changes enough according to its temperature. According to characters of the different types of capacitor 203, different safe temperature ranges of the capacitors 203 can be predetermined to adapt the charger protection device 20 to satisfy different demands.

Understandably, in spite of the fact that the resistance of the capacitance of the capacitor 203 may change frequently according to temperature, the absence of a control IC in the present charger protection device 20 means it cannot crash. Compared to typical charger protection devices, the present charger protection device 20 is more simple and cheaper to produce.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A charger protection device, comprising:
   an oscillator;
   a resistor electronically connected to the oscillator;
   a capacitor electronically connected to the resistor to form an oscillating circuit, the capacitor having a larger capacitance when its temperature is in a predetermined safe range, and having a lower capacitance when its temperature is higher than the upper limit of the safe range or lower than the lower limit of the safe range; and
   a switch electronically connected to the capacitor, a voltage across the capacitor being input to the switch.

2. The charger protection device as claimed in claim 1, wherein the switch automatically turns on and turns off according to its input voltage.

3. The charger protection device as claimed in claim 2, wherein the switch automatically turns on when receiving a predetermined low input voltage and turns off when receiving a predetermined high input voltage.

4. The charger protection device as claimed in claim 1, wherein the switch is electronically connected between the resistor and the capacitor.

5. The charger protection device as claimed in claim 1, wherein the capacitor has one lead electronically connected to the resistor and another lead connected to ground.

6. The charger protection device as claimed in claim 1, wherein the capacitor is a Z5U capacitor.

7. The charger protection device as claimed in claim 1, wherein the voltage across the capacitor is predetermined to be a low potential when the temperature of the capacitor is in the predetermined safe range, and the voltage across the capacitor is predetermined to be a high potential when the temperature of the capacitor is higher than the upper limit of the safe range or lower than the lower limit of the safe range.

8. The charger protection device as claimed in claim 7, wherein the safe range is about 0° C.-60° C.

9. The charger protection device as claimed in claim 1, wherein at least one of the oscillator, the resistor, the capacitor and the switch is installed in a charger.

10. The charger protection device as claimed in claim 1, wherein at least one of the oscillator, the resistor, the capacitor and the switch is installed in a battery.

11. The charger protection device as claimed in claim 7, wherein the switch automatically turns on when receiving the voltage across the capacitor that is the low potential, and automatically turns off when receiving the voltage across the capacitor that is the high potential.

12. A charger protection device, comprising:
    an oscillator;
    a resistor electronically connected to the oscillator;
    a capacitor electronically connected to the resistor to form an oscillating circuit, the capacitance of the capacitor changing according to the temperature of the capacitor to regulate the voltage across the capacitor, such that the voltage across the capacitor is at a first level when the temperature of the capacitor is in a predetermined safe range, and is at a second level when the temperature of the capacitor is higher than the upper limit of the safe range or lower than the lower limit of the safe range; and
    a switch electronically connected to the capacitor, the switch configured for connecting a charger with a battery to charge the battery using the charger, a voltage across the capacitor input to the switch to turn the switch on and off.

13. The charger protection device as claimed in claim 12, wherein the safe range is about 0° C.-60° C.

14. The charger protection device as claimed in claim 12, wherein the switch is turned on when the voltage across the capacitor is at the first level and is turned off when the voltage across the capacitor is at the second level.

15. The charger protection device as claimed in claim 12, wherein the first level is a lower level and the second level is a higher level.

* * * * *